Nov. 21, 1967     P. M. KOBREHEL     3,353,229

MOLDING RETAINER CLIP

Filed Feb. 25, 1966

INVENTOR.
Peter M. Kobrehel
BY
Paul Fitzpatrick
ATTORNEY

United States Patent Office 3,353,229
Patented Nov. 21, 1967

3,353,229
MOLDING RETAINER CLIP
Peter M. Kobrehel, Warren, Mich., assignor to General Motors Corporation, Detroit, Mich., a corporation of Delaware
Filed Feb. 25, 1966, Ser. No. 530,024
4 Claims. (Cl. 24—73)

This invention relates to fasteners and more particularly it relates to a molding clip for securing a molding strip to a body panel such as on automotive vehicles.

There have been many different fastening means suggested for holding a molding strip to a vehicle body panel. Special problems arise in the connection of long molding strips to body panels. Usually such molding strips are held to body panels by bolted clips which extend through a hole in the body panel. These holes are drilled prior to the assembly of the molding and the body panel. Hence, in the assembly of long molding strips misalignment problems frequently occur due to slight variations in either the body panel or the molding strip. Therefore, the assembly of the molding strip to the body panel becomes rather time consuming and expensive in that new holes have to be drilled or the molding strip has to be forcibly bent to match up with the clips in the present hole pattern. Another problem involved with the drilling of holes through the panel is that these areas become prime targets for rust and corrosion.

It is, therefore, an object of this invention to provide a one-piece molding clip for securing a molding strip to a body panel which does not necessitate the drilling of holes through the body panel and which is adjustable to compensate for misalignment between the molding strip and the body panel. The one-piece molding clip of this invention further eliminates the disadvantage associated with the handling of two-piece clips.

Other objects, features and advantages of this invention will become obvious upon reference to the following detailed description and the drawings illustrating the preferred embodiment thereof, wherein.

Figure 1:
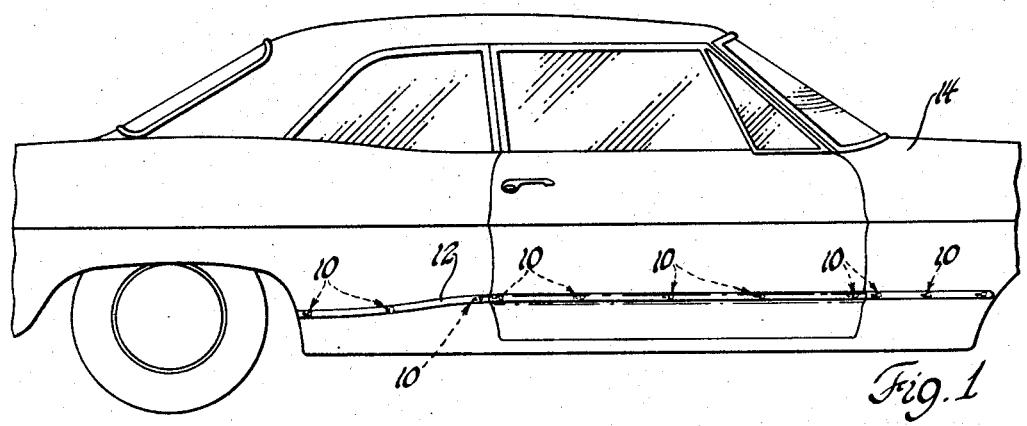
FIGURE 1 is a schematic view showing the invention as fastening a molding strip to an automobile.

More particularly, FIGURE 1 shows a plurality of molding clips 10 embodying the subject invention as used to fasten segments of a molding strip 12 to an automobile 14. The molding clips 10 are spaced at predetermined intervals along the molding strip; based upon the length and size of the molding strip and the amount of support required to secure the molding 12 to the automobile 14.

Figure 2:
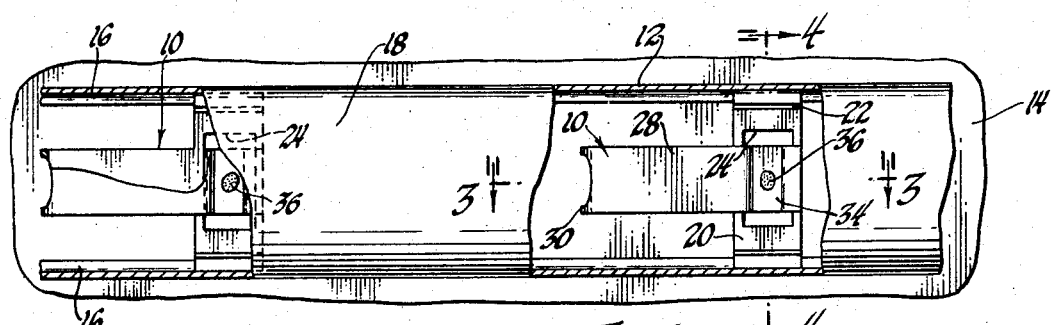
FIGURE 2 is an enlarged view of the molding and molding clip assembly with parts broken away and in section.
Figure 3:
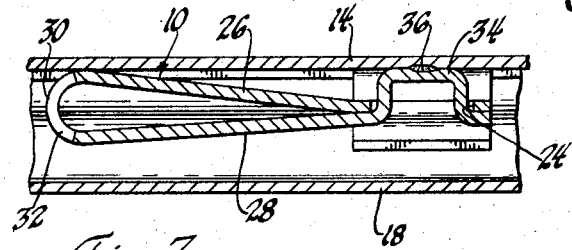
FIGURE 3 is a sectional view looking in the plane of line 3—3 in FIGURE 2.
Figure 4:
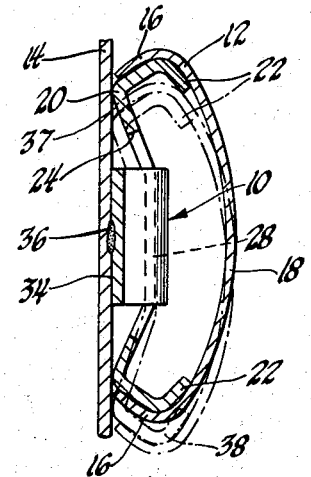
FIGURE 4 is a sectional view looking in the plane of lines 4—4 in FIGURE 2.

As shown in FIGURES 2 and 4, the molding strip 12 is of a standard type having a C-shaped cross section with a pair of inturned flanges 16 connected by a central span 18. The central span 18 is the portion visible to the observer of the automobile and is used for its decorative value.

Figure 5:
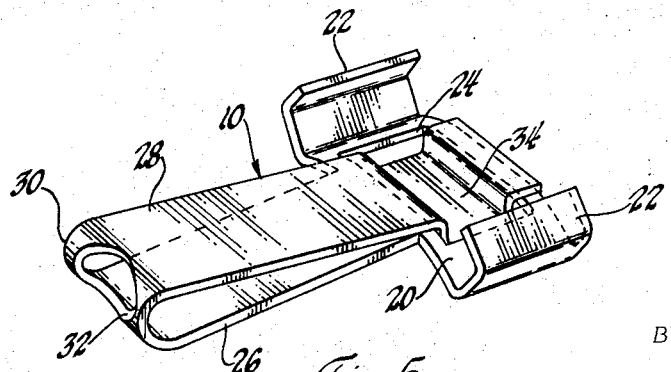
FIGURE 5 is a perspective view of the molding clip of this invention.

As best seen in FIGURE 5, the molding clip 10 includes a curved base member 20 which rests at its outer edges against the automobile 14. The base member 20 terminates at its two ends in flange portions 22 which are adapted to cooperate with the inturned flanges 16 on the molding strip 12. The base 20 also includes a rather large rectangular aperture 24 cut through its central portion.

A flat strip 26 extends laterally from and co-planar with the base member 20 and is recurved or reversely bent at a distance from the base member 20 into another flat strip 28 which overlies the strip 26. The curved connecting portion 30 between the strips 26 and 28 has a large portion removed thereby forming a central opening 32 therein. This curved connecting portion 30 thereby has a relatively small cross-sectional area and is frangible. The flat strip 28 overlying the strip 26 and the base member 20 includes a rectangular offset portion 34 which is somewhat smaller than the rectangular aperture 24 in the base member 20. This offset portion 34 then is adapted to extend through the aperture 24 into contact with the automobile 14. The offset portion 34 is then welded as at 36 to the automobile 14.

The clip 10 is designed such that the curved connecting portion 30 may or may not fracture when the offset portion 34 is pushed through the aperture 24 and welded to the automobile. If it does fracture it thereby allows the base member 20 to be completely free of the flat strip 28 and offset portion 34. Since the aperture 24 is substantially larger than the offset portion 34 this allows the base portion 20 to move relative to the offset portion 34 and the automobile 14 while being attached thereto. If the curved connecting portion 30 does not fracture the base portion 20 still is movable relative to the offset portion 34 as the cross section of the connecting portion 30 is so small that it provides little resistance to the movement of the base portion 20. This movement of the base portion 20 and the molding 12 attached thereto relative to the automobile 14 is shown in FIGURE 4 wherein the assembly moves from the solid lines 37 to the broken lines 38. This movement thereby makes the molding clip adjustable and allows for variations in the position of the molding strip to compensate for any errors in the alignment of the molding strip and the automobile panel. It should also be noted that the base portion 20 is curved so as to bias against strip 28 when assembled to thereby eliminate any rattle in the molding assembly.

Therefore, this invention provides a one-piece adjustable molding clip for adjustably fastening a molding strip to a body panel. This molding clip eliminates the great possibility of corrosion and rust by not necessitating an aperture through the automobile body panel. It further eliminates the problem of misalignment between the molding strip and the automobile by its built-in adjusting feature. Hence, a molding clip is provided which is relatively simple in structure and therefore economic which can successfully attach long molding strips to automobile body panels and eliminate the problems associated with such assemblies.

Although but one embodiment of the subject invention has been shown and described in detail many changes and modifications may be made thereto without departing from the scope of the invention.

I claim:

1. A one-piece adjustable molding clip to be used to fasten a molding strip to a body panel, said clip comprising:

a first strip having an aperture therein and having means to engage and hold said molding strip;

a second strip overlying and substantially parallel to said first strip, said second strip including an offset portion of smaller size than the aperture in said first strip, said offset portion extending through said aperture and being adapted to be welded to said body panel;

and a yieldable connecting portion reversely bent from said first strip to connect said first strip to said second strip, whereby said means on said first strip is laterally shiftable relative to the second strip.

2. A one-piece adjustable molding clip as set forth in claim 1 wherein said means includes a pair of upwardly and inwardly extending flanges engageable with said molding strip.

3. A one-piece adjustable molding clip as set forth in claim 1 wherein said connecting portion includes two relatively narrow segments at the sides thereof separated by an aperture.

4. A one-piece adjustable molding clip as set forth in claim 1 wherein said connecting portion includes a reduced section being adapted to fracture upon shifting of the first strip relative to the second strip.

References Cited

UNITED STATES PATENTS

| | | | |
|---|---|---|---|
| 2,779,986 | 2/1957 | Bylski | 24—73 |
| 2,973,565 | 3/1961 | Murphy | 24—73 |

WILLIAM FELDMAN, *Primary Examiner.*

G. WEIDENFELD, *Assistant Examiner.*